(No Model.)  2 Sheets—Sheet 1.
W. ROBERTS.
SECONDARY BATTERY.
No. 414,953.  Patented Nov. 12, 1889.
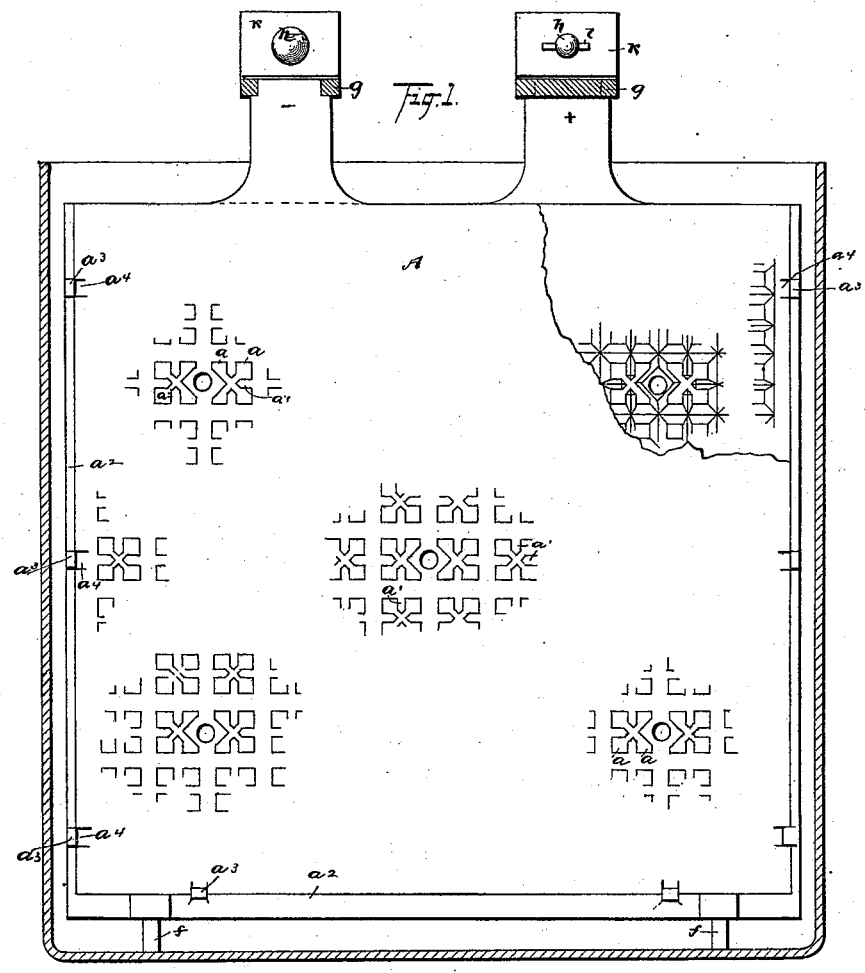
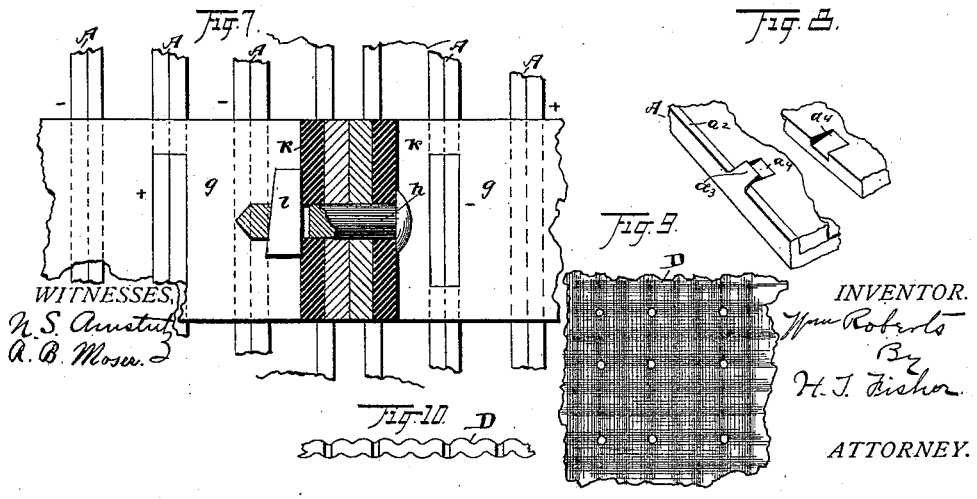
WITNESSES
N. S. Armstr[...]
A. B. Moser
INVENTOR.
Wm Roberts
By
H. J. Fisher
ATTORNEY.

(No Model.) 2 Sheets—Sheet 2.
W. ROBERTS.
SECONDARY BATTERY.
No. 414,953. Patented Nov. 12, 1889.
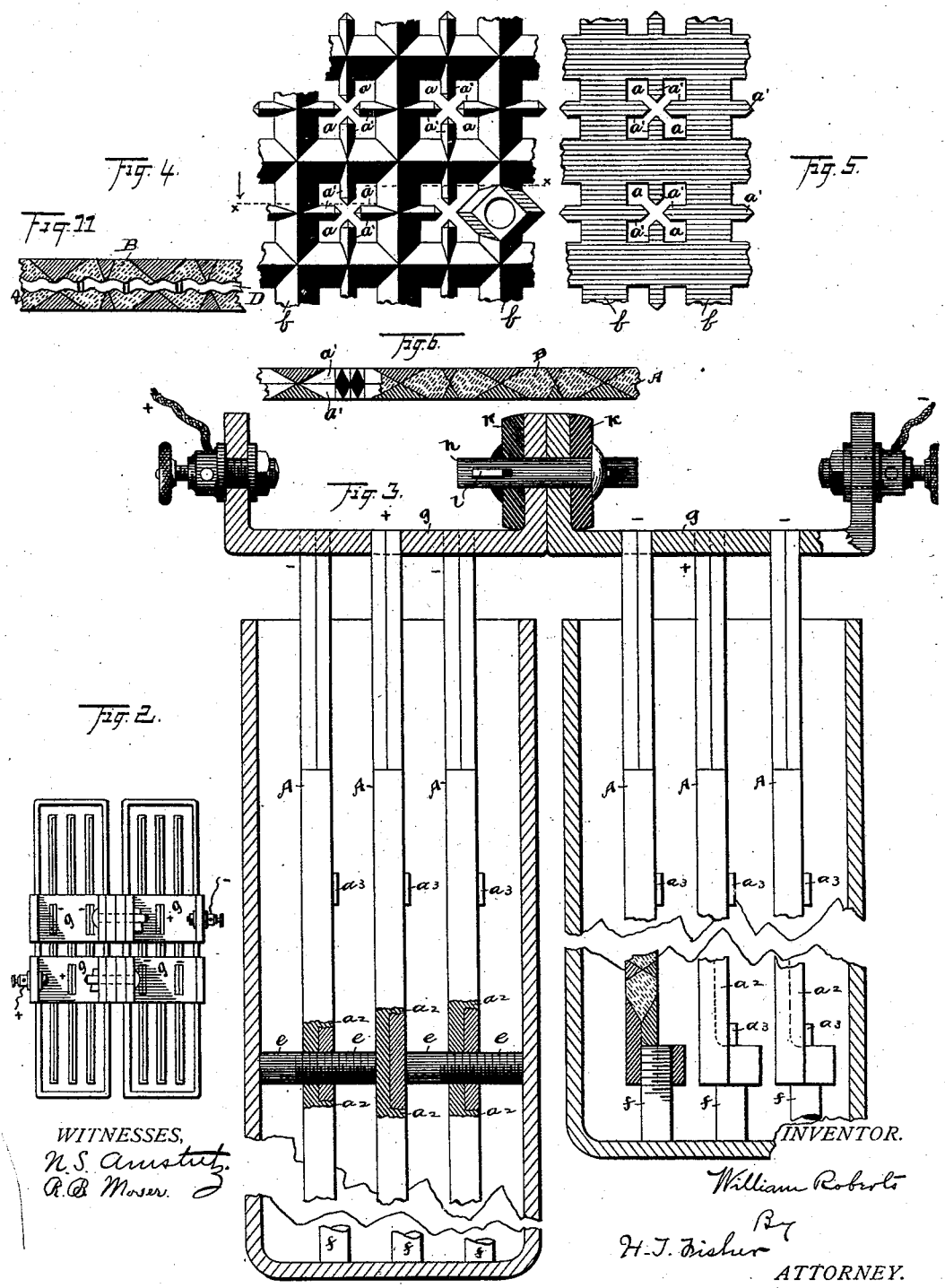
WITNESSES,
N. S. Amstutz
R. B. Moser
INVENTOR.
William Roberts
By H. J. Fisher
ATTORNEY.

UNITED STATES PATENT OFFICE.

WILLIAM ROBERTS, OF TORONTO, ONTARIO, CANADA.

SECONDARY BATTERY.

SPECIFICATION forming part of Letters Patent No. 414,953, dated November 12, 1889.

Application filed June 17, 1889. Serial No. 314,589. (No model.)

*To all whom it may concern:*

Be it known that I, WILLIAM ROBERTS, a citizen of Canada, residing at Toronto, in the Province of Ontario, Canada, have invented certain new and useful Improvements in Storage-Batteries; and I do hereby declare that the following is a full, clear, and exact description of the invention, which will enable others skilled in the art to which it appertains to make and use the same.

My invention relates to improvements in storage-batteries; and the objects of the invention are, first, to provide an electrode for storage-batteries which will afford the greatest practicable surface exposure on a given size of plate and the freest circulation of the current over said surface consistent with durability of the element and efficiency of service; secondly, to provide means whereby the electrodes are insulated from one another and at the same time prevented from buckling, if any such tendency were to manifest itself; thirdly, to provide a cheap and effective non-conducting support for the electrodes at the bottom of the cell to avoid short-circuiting at this point, and, fourthly, to furnish a convenient and efficient means of securing the plates together.

To these ends the invention consists, first, in an electrode formed of plates which have a number of openings extending through the same from side to side, and the inner side of each plate between the openings beveled, inclined, rounded, or otherwise so formed that two plates when brought together face to face will be out of contact and have more or less open space between them, except along the apex of the material between the openings, and from which point the said material slopes or recedes to the openings in lines at less than a right angle to the plane of the outer sides of the plates.

The invention further consists in the construction and arrangement of parts, as hereinafter fully described, and particularly pointed out in the claims.

In the accompanying drawings, Figure 1 is a plain elevation of the electrode with the parts broken away, and showing the inner side of the opposite plate at the right upper corner. Fig. 2 is a plan view of two cells connected by my improved coupling. Fig. 3 is a vertical sectional elevation, on an enlarged scale, of two cells coupled, as seen in Fig. 2, with the terminals for connecting the wires. Fig. 4 is a plain elevation of a section of one of the electrode-plates, showing the configuration and construction of the inner side of said plate, and Fig. 5 shows the outer or reverse side of a section of a plate. Fig. 6 shows two opposed sections of plates brought together as in use, and disclosing particularly the points on which said plates come in contact. Fig. 7 shows a cross-section of the coupling between the cells, and Fig. 8 shows sections of the respective plates with the means for securing the plates together. Fig. 9 is a plan view of a portion of the intermediate plate. Fig. 10 is an edge view thereof, and Fig. 11 a detail view showing said intermediate plate in relation to the other plates.

A represents my improved electrode, the plates of which are preferably made of lead cast into the desired shape, though any other suitable material or metal or composition of materials or metals may be used for this purpose. Usually two plates are employed to form a single electrode, and these are designed to be brought together face to face in such relation that they will constitute substantially a single plate so far as handling and the space occupied are concerned, and yet have such open space between them that practically the entire inner surface of each plate will be exposed to electrolytic action and will afford the freest possible circulation of the current over and upon said surface. This result I accomplish by taking a pair of plates which are duplicates of one another and constructed with openings *a* at frequent intervals extending through the body of the plate. The shape, form, or outline of these openings, or the size thereof, is not material, provided they serve the purpose of subdividing the surface of the plate so that the oxide B contained between the plates will be duly exposed to the electrolyte and the material left standing between the openings can be shaped to make room for the oxide in a practically continuous sheet, and at the same time confine the same in position.

In the drawings I show the plates with a series of blocked openings running in parallel lines and having short spurs $a'$ projecting from the respective edges of the openings toward the center thereof. At their extremities the spurs $a'$ are tapered to a V-point, and an open space occurs between these points as well as in the angles of the blocks—say a fourth of an inch, or thereabout, across. These blocked openings run close to the edge of the respective plates, so as to get the benefit of all the surface of the plates as nearly as practicable, and correspond in the respective plates, which brings the openings directly opposite one another. The strips $b$, by which the blocks are separated, likewise run at right angles across the plates and are, say, half an inch wide at their base on the outer side of the plate. The spurs $a'$ are cast in part with these strips. On their outer sides the respective plates thus cut up into strips and spurs except along their edges are perfectly plain and flat, but on their inner sides said strips and spurs are shown as beveled or inclined from their center outward toward each edge. Rounding instead of beveling or tapering these parts might do, but not as well as beveling or tapering on straight lines, for the reason that such construction would leave more contact-space along the apex of the strips and spurs than is desirable. Obviously the purpose is to reduce the contact between the plates to the minimum and to increase the surface contact of the oxide with the plates to the maximum, or as nearly in each case as is possible; hence, if a straight bevel or incline be used, the apex will be narrowed to a sharp edge, and this cannot be further reduced and enable contact to be made at all. Now, placing two plates thus constructed together, with the sharp edges on the inner surface of each matching the edges of the other, it will be seen that although the said plates are pressed firmly against one another so as to meet at all proper contact-points, there is no contact whatever except on what may be termed mere lines having no surface to speak of. It will also be observed that while thus reducing contact between the plates the surface exposed to the oxide is proportionally increased, and that when the oxide is pressed into the interstices between the opposed plates and fills all the open space therein the maximum of exposure is reached and greater surface cannot be gotten from plates of any given size. It will be further observed that by beveling the strips and spurs, as shown, they yield a larger surface than they would on a single plain side, which in an entire plate materially increases the aggregate of surface made available by this construction.

Another very material advantage of this construction is the security afforded for the oxide against shedding, casting off, or otherwise escaping from the cavities in which it is placed. These cavities or pockets all are wedge-shaped on their sides, and as the oxide becomes hardened before or in use it is so firmly embedded in the pockets that escape is impossible. Of course the openings are of such size and form that it cannot work out through them, and there could be no other danger unless the electrodes were to buckle sufficiently to permit the oxide to drop between the plates. This the severest tests have shown the electrode will not do; but if there were any danger of buckling from any cause whatever means are provided to prevent the same, as hereinafter described. It follows, therefore, that the oxide is so confined that it cannot escape, and the lines upon which it is separated between the blocked openings are so slight and immaterial that a free circulation is afforded for the current entirely over both plate-surfaces.

In case it is desired to still further increase the capacity of the cell, an intermediate plate D (shown partly in Fig. 9) may be introduced between the two outer plates and the oxide applied on both sides, so as to form a double layer of the oxide divided by said intermediate plate. This plate D preferably is stamped up into corrugations running at right angles to each other on both sides and perforated at intervals to match the openings in the outer plate. The full double corrugated surface of this intervening plate is thus added to the electrode and the number of ampère hours considerably increased. The formation of this inner plate may of course be varied and still keep within the spirit of this part of the invention; but I have shown and described a satisfactory form thereof.

One of the plates A has a slight flange or rib $a^2$ along its sides and bottom, and on this rib at intervals are lugs $a^3$. The opposite plate is made to rest within the rib or flange $a^2$, and has scarfs $a^4$, into which the lugs $a^3$ are adapted to be bent to fasten and hold the two plates together. This is found to be an economical and simple method of uniting the plates. To insulate the electrodes with respect to one another in the cell and keep them the proper distance apart, I employ pins $e$, made of hard rubber or other like non-conducting and durable material, which are set preferably only in the positive electrodes and extend through the same an equal distance on each side. Threaded holes are formed in the plates for the passage of the pins, so that they are firmly secured when in place. These pins may be two, three, or more in number, as may seem best, and, besides serving the purposes above described, prevent outward swelling of the plates and possible buckling, although it is believed from the severest known tests that this form of electrode with the double plates and intermediate oxide or paste is not subject to buckling. However, should there be any such tendency it will be met and resisted by the pins which bear against the plates at the respective sides, said plates in turn being braced from other plates, and thus on across the cell.

Similar pins to those which separate the electrodes are employed to support the plates above the bottom of the cell. Ordinarily in storage-batteries there is so much danger of the oxide being cast off and dropping into the bottom of the cell, and consequent short-circuiting, that some means of support above the bottom is deemed necessary. I have no fear from this source, but provide against any possible contingency by inserting plugs or pins $f$ in the bottom of the electrode on which it is supported. These pins are set in holes in the flange $a^2$, and being light, like the pins $e$, do not add weight to the cell.

Between the cells I employ a coupling G, the form of which is clearly shown in Fig. 7. The leads or strips $g$, by which the different electrodes are connected, are bent upward at their ends and perforated for the passage of a bolt $h$. To prevent wear upon the lead, I use a washer $k$, of hard rubber or other equivalent material, on either side of the shoulders so formed, and pass the bolt through the same. This bolt has a head at one end and a transverse slot in the other, and a wedge or key $l$ driven into the slot serves to make a perfectly close and safe connection. The importance of good connections between cells is well understood, as it keeps down resistance and contributes to a free flow of the current, and this coupling is especially good because it makes and keeps the connection perfect, and is withal so simple and so quickly and easily fastened and released. The chief advantage and value of my invention, however, is found in the construction of the plates, whereby a greatly-enlarged surface and free circulation of the current in both charging and discharging the battery are obtained, the oxide is held in position, and the battery is made proof against buckling, however rapid the discharge or other strain put upon it.

In other particulars than those herein referred to this battery will be handled and treated as other storage-batteries of the type to which it belongs.

In practice I am in the habit of first uniting the plates, and then introducing the oxide or paste through the openings at one side and pressing the same in until all the crevices and parts of the pockets or cavities are thoroughly filled. The outer surface of the plates is then cleaned and the work is finished.

As before stated, I do not confine myself to the special design or form of plate here shown, as this way may be materially varied and still be practically the same thing in effect, and I claim the right to make such change when desired.

One half or section of each pocket or cavity is in each plate, and the greater depth of oxide comes in the center of the pocket, where it is supported by the spurs.

The use herein of the terms "oxide" or "paste" is to be understood as referring to and covering such active or absorbing substance or material as is commonly employed in this class of batteries.

It will be observed that the inner surfaces of the strips between the openings are inclined at less than a right angle to the outer side, forming an acute angle thereto, thus enabling me to get a large surface exposure for the paste on very thin plates. This is evident from Figs. 4 and 5, which are drawn to plates of working size. The strips purposely are made of considerable width and little thickness, and then by beveling, as shown, an area of surface is obtained in an otherwise light electrode not possible by any other construction of which I am aware.

Having thus described my invention, what I claim as new, and desire to secure by Letters Patent, is—

1. In a storage-battery, a plate constructed with a series of openings and strips separating the openings, having their inner sides inclined from about the center to the respective edges in lines running at less than a right angle to the outer side of the plate, whereby a large active surface is afforded in thin plates, substantially as set forth.

2. In a storage-battery, a plate formed with a series of openings and having strips between the openings, the outer sides of which are flat and the inner sides oppositely beveled from the center in lines running at acute angles to the outer side, substantially as set forth.

3. In a storage-battery, an electrode consisting of two plates suitably united face to face, said plates formed in strips arranged oppositely to one another, the face of said strips beveled from the center to the edges in lines at less than a right angle to the plane of the outer side of the plate and in contact at the point where the bevel-lines intersect, whereby the entire inner surface of the said plates is exposed to action, substantially as set forth.

4. In storage-batteries, a plate provided with openings extending through from side to side, and spurs projecting into said openings from about the edges thereof, substantially as set forth.

5. In storage-batteries, a plate formed with a series of openings separated by strips having oppositely-inclined faces, and projections with beveled sides extending into said openings, substantially as set forth.

6. In storage-batteries, an electrode consisting primarily of two plates having smooth outer surfaces and a series of openings divided by strips, said strips formed on their inner sides with bevel-faces extending from about the openings back to the center of the strips, and projections on said strips extending into the said openings, substantially as set forth.

7. In storage-batteries, an electrode having two outer plates, one of which is formed with lugs along its edge bent to bear against the side of the other plate and serving to hold the two plates together, substantially as set forth.

8. In storage-batteries, an electrode consisting of separate plates, one of said plates having a projection at its edge for the other plate to rest against, and lugs on one of said plates bearing against the side of the opposite plate, substantially as set forth.

9. In a storage-battery, an electrode having one plate with ribs along its edges, and projections along said ribs to hold the other plate in position laterally, substantially as set forth.

10. In a storage-battery, a pair of plates having uneven inner sides, and an intermediate plate having two uneven sides, and a paste between said plates, substantially as set forth.

11. In storage-batteries, an electrode provided with screw-threaded holes through its sides, in combination with pins of non-conducting material threaded and screwed into said holes, said pins extending laterally to bear against the adjacent plates on either side, substantially as set forth.

12. In storage-batteries, an electrode provided with sockets along its bottom, and pins of non-conducting material set in the said sockets and supporting said electrodes, substantially as set forth.

13. In a storage-battery, an electrode formed of plates having coincident openings, and strips between the openings having their faces inclined oppositely from about the center of the strips, in combination with an intermediate plate having openings extending from side to side, substantially as set forth.

In testimony whereof I hereunto set my hand this 10th day of June, A. D. 1889.

WILLIAM ROBERTS.

Witnesses:
GEO. M. S. WILSON,
A. E. BULL.